W. F. BARNES.
BASKET MAKING MACHINE.
APPLICATION FILED MAY 20, 1920.

1,387,093.

Patented Aug. 9, 1921.
6 SHEETS—SHEET 4.

WITNESSES
Harry Jacobson
Samuel L. Pink

INVENTOR
WILLARD F. BARNES
BY
William Sea Jr.
ATTORNEY

UNITED STATES PATENT OFFICE.

WILLARD F. BARNES, OF BERKELEY, CALIFORNIA, ASSIGNOR TO S. V. BARNES, OF BERKELEY, CALIFORNIA.

BASKET-MAKING MACHINE.

1,387,093.  Specification of Letters Patent.  Patented Aug. 9, 1921.

Application filed May 20, 1920. Serial No. 382,920.

*To all whom it may concern:*

Be it known that I, WILLARD F. BARNES, a citizen of the United States, residing in the city of Berkeley, county of Alameda, State of California, have invented new and useful Improvements in Basket-Making Machines, of which the following is a specification.

This invention pertains to automatic machines of the class used to manufacture baskets, boxes, cartons, crates, barrels and other receptacles made of very thin sheets or slices or veneers of wood, or other suitable materials or substances, and bound or reinforced by a metallic strip or strips, or other suitable material or materials, or substance or substances.

An important object of my invention is the provision of a machine, simple in construction, that will greatly reduce the amount of waste material, caused by deformation of the baskets, boxes, cartons, crates, barrels or other receptacles, so frequently occurring in machines as at present constructed.

Another important object is to provide a machine that will manufacture baskets, boxes, crates, cartons, barrels and other receptacles of any size or shape, made of very thin sheets or slices or veneers of wood, or other suitable materials or substances, and bound or reinforced by a strip or strips of metal, or other suitable substances.

Another important object is to provide a machine that will attain a maximum productive efficiency per hour and be economical in power consumption.

Other objects will become manifest.

It is desired to provide a machine that will form or manufacture a basket, box, crate, carton, barrel or other receptacle of two pieces, or sheets, or slices, or veneers, of wood, or other suitable material or substance (which will be referred to hereinafter as slices), that have been previously shaped and sized in blank, by automatically placing one across the other, bending the projecting portions to form the sides and then binding the edges to form the permanent basket, box, crate, carton, barrel or other receptacle, and ejecting the same from the machine. Any thickness of bottom and sides may be attained by using, as the case may be, more than one set of slices.

My invention comprises details of construction, the elements and the combination of elements, and will be clearly explained by reference to the drawings, in which—

Similar numerals refer to similar parts throughout the several views.

The embodiment of my invention follows. The table or top plate 90, its sets of legs or standards 90ª and 90ᵇ with bars, and the bottom plate 15 constitute the framework of the machine.

The main shaft 6 is furnished with a cam 100 (Fig. 13), a cog-wheel 5 (Fig. 1), a large gear 163 (Fig. 29), and a cam 191. The cog-wheel 5 has secured to it a cam 4 furnished with an inside rim 38 and an outside rim 39, both of which form the channel 37 in which the wheel 11 rotates. The wheel 11 is on the end of the rod 10. The cam 4 is also furnished with an arm 3.

Figure 30:
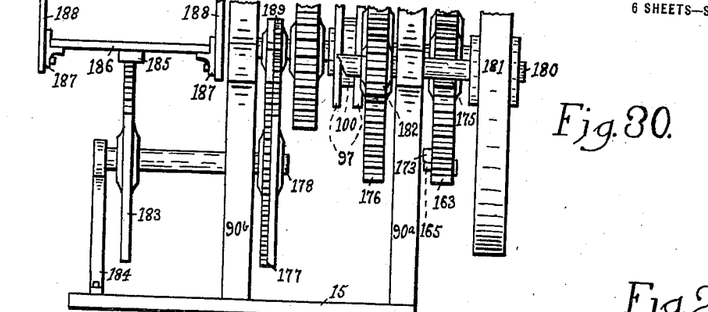
Fig. 30 is an end elevation of a portion of the mechanism for operating the machine, showing especially the means for counting off fifty finished baskets and advancing same so that they may be readily taken away by any suitable means or mechanism.

The shaft 113ª is furnished with the pinion 175, a large gear 176, a cam 114, and a double intermittent pinion 189 (Fig. 30). The pinion 175 gears into the large gear 163.

The drive-shaft 180 (Figs. 29 and 30) is furnished with a driving wheel 181 and a pinion 182. The pinion 182 gears into the large gear 176.

Figure 29:
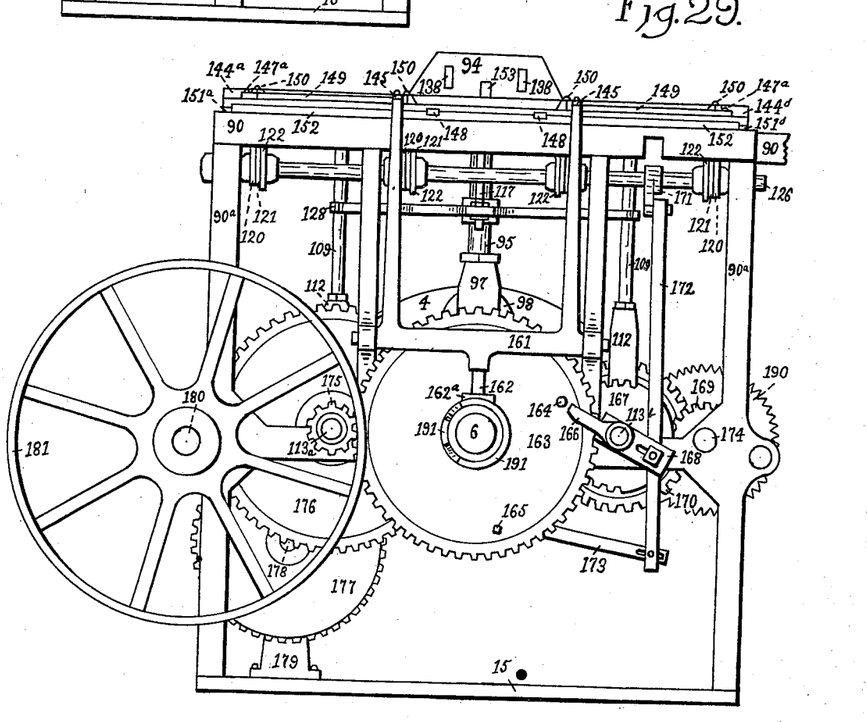
Fig. 29 is a front elevation of the machine showing a portion of the mechanism for the operation of the same.

The shaft 113ᵇ is furnished with a lever 166 (Fig. 29), an intermittent gear 167, a similar cam as cam 114 on the shaft 113ª (Fig. 16), and a gear 170 (Fig. 29).

Figures 7, 8, 9, 10, 11, 12:
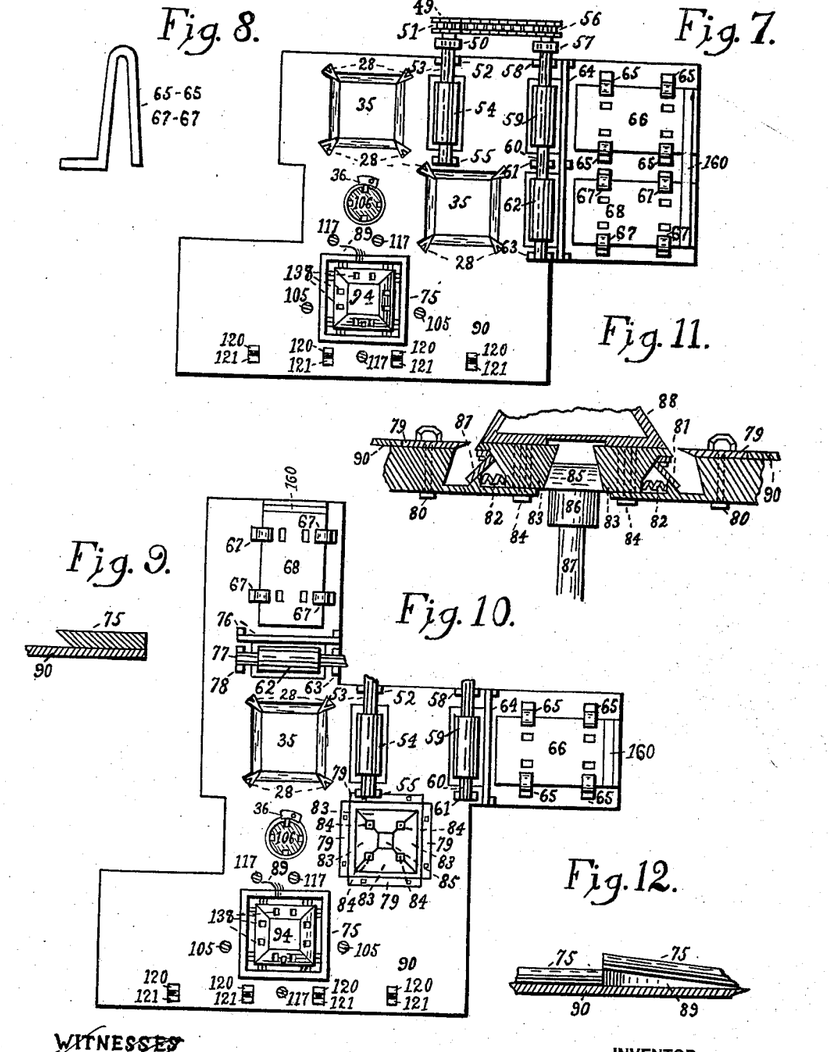
Fig. 7 is a plan view of the top of the machine without the cross-arm carrier, bending links binding strips frame, or slice-cutting knives.
Fig. 8 is a side elevation of the means for holding the slices in piles.
Fig. 9 is an end elevation of a section of the rim around the channel in which the binding strips are clamped on to the slices.
Fig. 10 is a plan view of the top of the machine with the slice-trimmer knives, and without the cross-arm carrier or bending links binding strips frame.
Fig. 11 is a detailed view through a section of the slice-trimmer knives.
Fig. 12 is an elevation view of a section of said rim showing the raiser.

The shaft 174 is furnished with a pinion 169, and a gear 190. The pinion 169 gears operably into the intermittent gear 167, so that for the required time the shaft 174 remains idle. The gear 190 is operably connected up with the slice-advancing rolls shaft 60 (Fig. 7).

The shaft 178 (Figs. 29 and 30) is furnished with a double intermittent gear 177 and an intermittent gear 183 (Fig. 30). The shaft 178 is held in position by the supports 179 (Fig. 29) and 184 (Fig. 30). The gear 177 is so constructed that one-half of its rim has teeth all the way around to the number of sixty-six, which teeth are geared by the one tooth on the one-half of the rim of the pinion 189, while the other half of the rim of the gear 177 has sixteen teeth, which teeth are geared by the sixteen teeth on the other half of the rim of the pinion 189. The intermittent gear 183 has sixteen teeth gearing into the rack 185 (Fig. 30) secured to the slide 186 which works in the brackets 187 secured to the hangers 188. The further operation of the slide 186 will be explained as the steps in the manufacture of the basket are taken up.

Figures 20, 21:
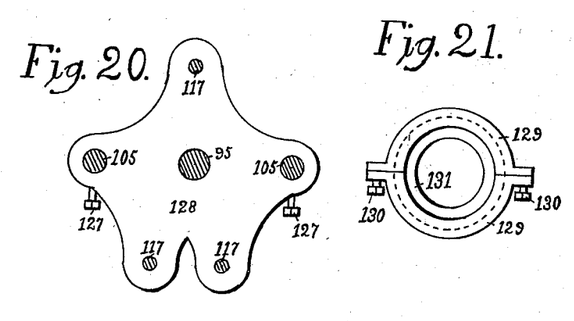
Fig. 20 is a plan view of the plate for supporting the mechanism for opening and closing the bottom of said channel.
Fig. 21 is a top view of the band with inserted caps for retaining the ends of the sliding sleeves.
Figure 22:
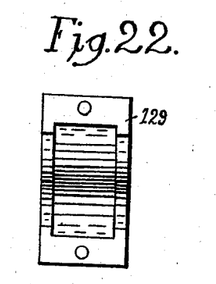
Fig. 22 is a side view of one-half of said band.
Figure 23:
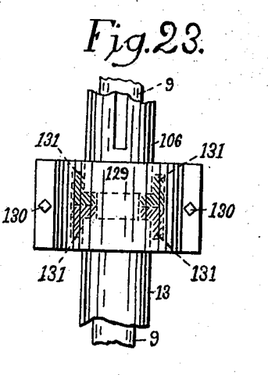
Fig. 23 is an elevated view showing the method of attaching said band.

The revolving sleeve 106 (Fig. 1) revolves in a bushing set into the top plate 90. In the revolving sleeve 106 and in the box 8 secured to the bottom plate 15, the arbor-rod 9 is held in position. The arbor-rod 9 is kept from turning with the revolving sleeve 106 by means of a set screw in the box 8. The revolving sleeve 106 has secured to its upper end the cross-arm carrier 143. This carrier is old in such machines. On the revolving sleeve 106 below the top plate 90 is located a four-point spider 2 secured to a collar 1 which is adjusted on the revolving sleeve 106 by means of the set-screw 45. The lower end of the revolving sleeve 106 is secured by pins to the upper one of a set of caps 131 (Fig. 23). The lower one of the set of caps 131 is secured to the upper end of the sliding sleeve 13 which slides up and down the arbor-rod 9. The set of caps 131 are held in position by the band 129. This band is made in two parts (Fig. 21) for convenience in adjusting. The two parts are adjusted and held in position by the bolts 130. The band 129 is recessed as shown in Fig. 22, to hold the caps 131, and yet permit the revolving sleeve 106 and the sliding sleeve 13 with their respective caps 131 to function therein independent of each other. This principle is carried out so that when the sliding sleeve 13 is raised, thus raising the revolving sleeve 106, the sliding sleeve 13 may remain stationary for the required length of time, while the revolving sleeve 106 is turned around the required distance until it is locked by the clutch 36 on the upper side of the top plate 90 in one of the four grooves 29 (Fig. 7) in the revolving sleeve 106.

Figures 1, 2, 3, 4, 5, 6:
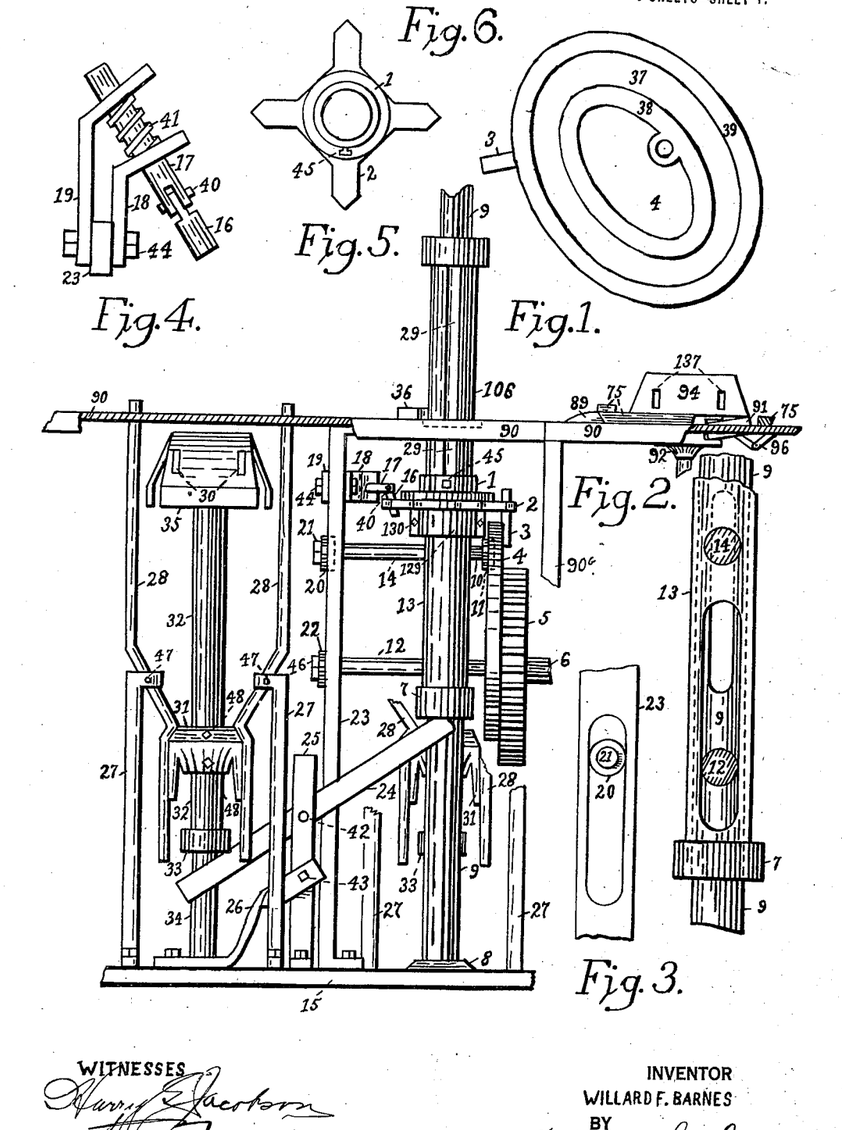
Figure 1 is a detailed side elevation of the mechanism for raising and lowering the cross-arm carrier with formers, in combination with the mechanism for forcing the slices into the formers.
Fig. 2 is a section of a part of the mechanism for raising and lowering said cross-arm carrier.
Fig. 3 is a section of the support for a part of said mechanism.
Fig. 4 is a detailed view of the stopper that checks the four-point spider.
Fig. 5 is a plan view of the four-point spider.
Fig. 6 is a plan view of the cam with the channel and the arm.

The arbor-rod 9 is provided with a slot adapted to the horizontal rod 10 for the purpose of permitting the rod 10 to slide up and down therein. The rod 10 is provided with an enlarged extension 14, one end of which is adapted and fits snug against the sliding sleeve 13 (Fig. 2), and the other end passes through a slot in the support 23, on which end is located the wheel 20 adapted to the said slot and adjusted by the nut 21. The wheel 20 rotates up and down in and is guided by this slot (Fig. 3).

The main shaft 6 after passing through the arbor-rod 9 is provided with a reduced extension 12, one end of which is adapted to and fits snug against the arbor-rod 9 (Fig.

2), and the other end passes through the support 23 and is secured by the adjusting ring 22 and the nut 46.

The sliding sleeve 13 is provided with a slot adapted to the extension 12 (Fig. 2) for the purpose of permitting the extension 12 to slide up and down therein.

The support 23 is secured to the under side of the top plate 90 and to the bottom plate 15.

The spider check 16 is secured in a slot in the rod 17 by means of a pin 40, so that it will hang down at an angle and be prevented from turning under by a slope at the inner end of the slot. The rod 17 passes through the two angle bars 18 and 19 which are secured to the support 23 by means of the bolt 44. Between the angle bars 18 and 19 and around the rod 17 is the cushion spring 41. The check 16 prevents the revolving sleeve 106 from turning around more than necessary and aids in checking the jar of the sudden stop. The clutch 36 holds the revolving sleeve 106 in position while it is descending with the cross-arm carrier 143 with the formers 142 for the purpose of receiving slices in two of the formers 142, and making a basket from the slices in the third former 142, and ejecting a finished basket from the fourth former 142.

As the cam 4 rotates, the sliding sleeve 13 descends with the revolving sleeve 106, thus permitting the spider 2 to be released from the check 16 and to be rotated one-quarter section by means of the arm 3 secured to the cam 4.

The sliding sleeve 13 is provided with a butt 7. In the descent of the sliding sleeve 13, the butt 7 forces one end of the bar 24 down. This bar functioning through a pin 42 is supported by the upright 25 secured to the bottom plate 15. The upright 25 through the bolt 43 is held firm by angle iron 26 secured to the bottom plate 15.

The top plate 90 has openings to permit the mechanism of which the plungers 35, 35 are a part to function. The plungers 35, 35 are secured to the sliding sleeves 32, 32 which are furnished with butts 33, 33 at the lower end thereof. The plungers 35, 35 are furnished with slots at the corners to permit the slice-adjusters 28, 28 to draw in the required distance for the purpose of adjusting the slices. The upper portion of the sides of the plungers 35, 35 is shaped to conform to the formers 142 and have slots 30 for the reception of the teeth or pins of the retainers 141. The lower portion of the sides of the plungers 35, 35 conform to the said openings in the top plate 90.

The sliding sleeves 32, 32 slide up and down on the rods 34, 34 secured to the bottom plate 15. On the sliding sleeves 32, 32 are secured by set screws 48 the collars 31, 31. These collars are so shaped that the upper portion is sloped upward and inward with portions of the slope flattened off in four places, and the lower portion is furnished with extensions downward and directly below where the slope is flattened off. (Fig. 1).

The slice-adjusters 28, 28 are pivoted by the pins 47 to the supports 27, 27 secured to the bottom plate 15. For each plunger 35 there is a set of four slice-adjusters 28 shaped to function with the collar 31. There are also four supports 27 placed in the form of a square and turned with the angle portion thereof toward the center just enough to permit the slice-adjusters 28, 28 to function with the collars 31, 31. The upper portion of the slice-adjusters 28, 28 extend through and above the openings in the top plate 90 (Fig. 7) to adjust the slices upon the plungers 35, 35.

When one end of each bar 24, 24 is forced down by the butts 7, 7, the other end is forced up against the butts 33, 33 of the sliding sleeves 32, 32, thus compelling the sliding sleeves 32, 32 to slide up on the rods 34, 34, by which action the collars 31, 31 cause the slice-adjusters 28, 28 to spread below the pins 47, 47 and to draw in above the said pins, thus adjusting the slices into proper position upon the plungers 35, 35. At the same time the sliding sleeves 32, 32 raise the plungers 35, 35 through and above the openings in the top plate 90.

The slices are placed in piles on the slides 66 and 68 (Fig. 7 or Fig. 10) and are held in place by the respective angle posts 65 and 67 (Fig. 8). The slides 66 and 68 (Fig. 7) are furnished with a strip 160 for the purpose of separating the bottom slice of the piles resting upon the slides 66 and 68, thus more readily advancing the slices toward the slice rolls 59 and 62 with the forward movement of the slides 66 and 68. The slide 66 (Fig. 10) is likewise furnished with a strip 160 for a similar purpose of separating the bottom slice of the pile resting upon the slide 66, thus more readily advancing the slices toward the slice roll 59 with the forward movement of the slide 66. The slide 68 (Fig. 10) is likewise furnished with a strip 160 for a similar purpose of separating the bottom slice of the pile resting upon the slide 68, thus more readily advancing the slices toward the slice roll 62 with the forward movement of the slide 68.

Figure 24:
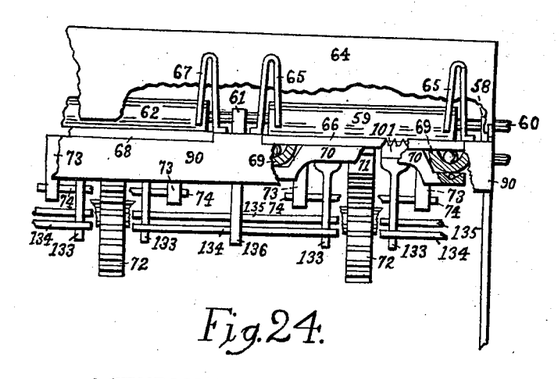
Fig. 24 is an elevated end view of the mechanism for advancing the slices, one at a time from the piles.
Figure 25:
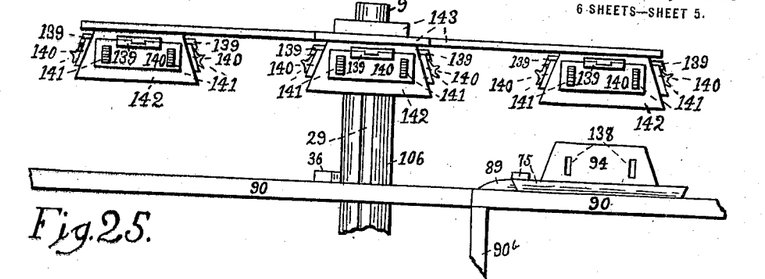
Fig. 25 is a front and side view of the means for retaining the slices in the formers.

Under the slides 66 and 68 are the ball bearing retainers 69 with grooves (Fig. 24). There is a set of ball bearing retainers for each slide. Secured to the under side of the slides 66 and 68 at each end are the guides 70, 70. In the ends of each guide 70 are grooves furnished with ball bearings working against the under side of the retainers 69. This combination of ball bearings gives the slides 66 and 68 an easy sliding movement. Also secured to the underside of the slides 66 and 68, near their center, are the racks 71, 71, one for each slide, engaging a gear 72 which is operated by any suitable mechanism through the main shaft 6. The slides 66 and 68 are provided with four slots (Fig. 7). Also secured to the underside of the slides 66 and 68, near each end, are hangers 73, 73, through which the rods 74 pass. There are two sets of hangers for each slide. On the rods 74, the rods 133, 133 oscillate. These rods 133, 133 contain at their upper end the dogs 101, the teeth of which protrude through the slots in the slide 66 and 68, to engage and assist the slices on the bottom of the piles to advance with the slides 66 and 68 so that the ends of the slices may be gripped by the slice rolls 59 and 62.

Bars 134 and 135 are connected to the framework at suitable places. Before the slices advance, the rods 133, 133 are in a slanting position with the dogs 101 to the left of the rods 74. The teeth of the dogs 101 impress themselves in the slices. In the following movement of the machine, the slides 66 and 68 are advanced by the gears 72, 72 through the racks 71, 71, and the dogs 101, still impressed in the bottom slices, move forward until the rods 133, 133 come into contact with the bars 135, 135. The teeth then release the slices and the slices continue their forward movement by means of the slice rolls 59 and 54 for one slice and the slice roll 62 for the second slices to position over the plungers 35, 35.

As the cross-arm carrier 143 with the formers 142 comes down, the plungers 35, 35 are forced up into two of the formers 142, thus depositing the slices 158 (Fig. 28) therein.

Figure 28:
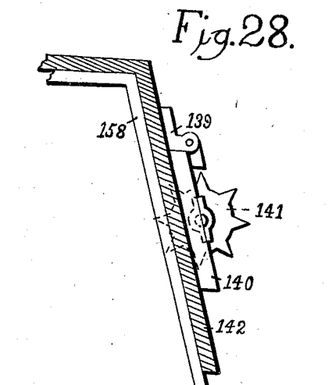
Fig. 28 is a side elevation of the means for retaining the slices in the formers.

The slices 158 are retained in the formers 142 by means of the teeth or points of the spools 141. These spools 141 are operably retained in the plates 140 which are hinged to the sides of the formers 142 by means of the hinges 139. The plates 140 are furnished with slots to permit the teeth or points of the spools 141 to penetrate the slices 158 (Fig. 28).

The plungers 35, 35 are also furnished with slots to permit the teeth or points of the spools 141 to extend through, in the case the teeth or points of the spools 141 are a little too long at times.

The mold-block 94 is also furnished with slots 138 for the purpose of permitting the teeth or points of the spools 141 to extend through so that they would not be worn off or catch the sides of the mold-block 94.

Around the opening in the top plate 90, in which the mold-block 94 is located, there is a rim 75 constructed as shown in Fig. 9, except that in one place it is sloped up to conform to the height of the raiser 89.

Figure 26:
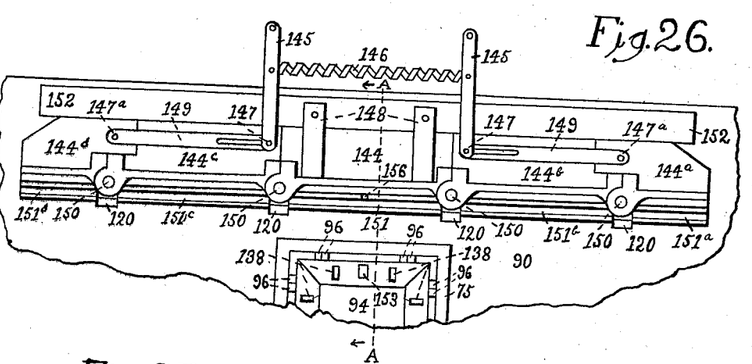
Fig. 26 is a plan view binding-strip bending frame.
Figure 27:
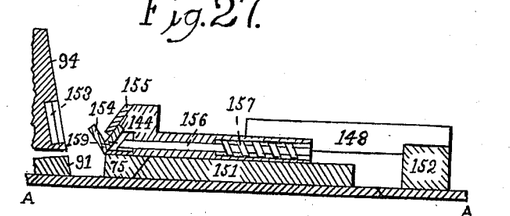
Fig. 27 is a cross section through the binding-strip bending frame and the mold-block showing the means for making the electrical contact in case the V-shaped tin or binding-strip does not feed in or the slices do not properly insert in the said channel.

The binding strip bending frame of five links 144, 144$^a$, 144$^b$, 144$^c$ and 144$^d$ is in itself old in such invention. In Figs. 26 and 27, is shown various new and useful parts. Each link is furnished with a slide 151 operably connected thereto. The lower portion of each link is recessed the thickness of a binding strip to permit the binding strip to be retained therein by means of the retainer 155. In Fig. 27, is shown a section of the binding strip 154 retained in the recess by the retainer 155. Each link is furnished with a retainer 155. The middle bending link 144 is retained in position in its forward and backward movements by means of the guides 148. (Fig. 26). Fig. 27 is a cross section of the binding strip bending frame through A, A, as shown in Fig. 26. Both the links and the slides are recessed to conform to the openings in the top plate 90 in which the kinking dies operate. The pushrods 145 are connected by a spring 146 to draw the links into a straight line against the strip 152 in the backward movement of the frame. The outer ends of the push rods 145 are connected to the fork 161 (Fig. 29).

The middle bending link 144 has a backward and forward movement through the guides 148. In the first movement to bend the binding strips around the mold-block 94, the five bending links move forward in line with the forward movement of the middle bending link 144, before the bending links 144$^a$, 144$^b$, 144$^c$ and 144$^d$ commence to fold around the mold-block 94. The bending links 144$^a$, 144$^b$, 144$^c$ and 144$^d$ are linked together by the hinge-pins 150. The push-rods 145 are actuated on by the fork 161 and are connected with the toggle-links 149 through the pin 147 in the push-rods 145 and working in the slots in the toggle-links 149. The toggle-links 149 are connected with the bending links 144$^a$ and 144$^d$ by the pins 147$^a$ so that the bending links 144$^a$ and 144$^d$ will turn easily and fully around to complete the required turn. The folding of the bending links 144$^a$, 144$^b$, 144$^c$ and 144$^d$ around the mold-block is effected by the action of the push-rods 145 and the toggle-links 149 through the fork 161. The fork 161 is given a forward and backward movement by means of a cam 191 on the main shaft 6, through wheel 162$^a$ located on lower end of rod 162.

The slides 151, 151$^a$, 151$^b$, 151$^c$ and 151$^d$ of their respective links 144, 144$^a$, 144$^b$, 144$^c$ and 144$^d$ are adapted to the outer edge of the rim 75 (Fig. 27). As the slide 151 comes into contact with the rim 75, the middle bending link 144 continues its forward movement over the rim 75 (Fig. 27) the required distance, while the other links with their respective slides are folding around the mold-block 94, the links and their respective slides performing the same movements as are explained for the middle bending link 144 and its respective slide 151. The bending link 144$^a$ with its respective slide 151$^a$, while being folded around the mold-block 94, slides up on the raiser 89, so that the end of the binding-strip which it is bending around the mold-block 94 will clear the other end of the binding-strip being bent around the mold-block 94 from the opposite direction by the bending link 144$^d$, and so that, when the end of the binding-strip bent around the mold-block 94 by the bending link 144$^d$ is in place, the other end of the binding-strip bent around the mold-block 94 by the bending link 144$^a$, snaps into place in the end of the binding-strip bent by the bending link 144$^d$, so as to make a connection varying in length according to the length of the binding-strip.

Figure 18:
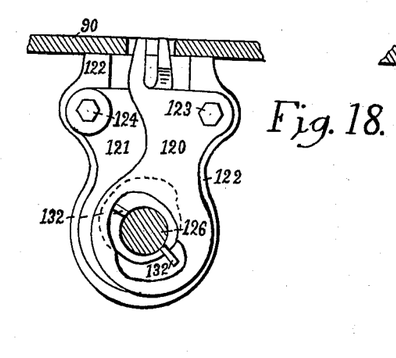
Fig. 18 is a detailed side elevation of the kinking-dies.
Figure 19:
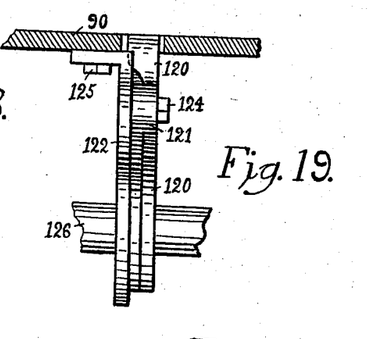
Fig. 19 is an end elevation of said kinking-dies.

As soon as a binding-strip is fed into the recesses of the bending links 144, 144$^a$, 144$^b$, 144$^c$ and 144$^d$, it is kinked or indented by the kinking-dies 120 and 121. The kinking-dies 120 and 121 form the set. These are operably connected to the support 122 by means of pin-bolts 123 and 124 respectively. The support 122 is secured to the under side of the top plate 90 by bolts 125 (Fig. 19). There are four sets of the kinking-dies 120 and 121. During the inaction of the kinking-dies 120 and 121, the kinking or indenting portion thereof is flush with the upper side of the top plate 90. As shown in Figs. 18 and 19, the kinking-dies 120 and 121 are located in slots in the top plate 90, and directly under the recesses in the bending links and their respective slides as shown in Fig. 26. The kinking or indenting of the binding-strip by the kinking-dies is effected by means of pins 132 (Fig. 18) secured in the rod 126 which in rotating causes the kinking-dies 120 and 121 to close and open. The rod 126 is operably connected up by suitable mechanism. In the closing movement of the kinking-dies, thus kinking or indenting the binding-strip in four places, the kinking or indenting portions of the kinking-dies 120 and 121 extend through the slots in the top plate 90 and into the recesses of the bending links and their respective slides.

The slice rolls 59 and 62 are operated by the shaft 60 supported by the bearings 58, 61 and 63 secured to the top plate 90 (Fig. 7). The slice roll 54 is operated by the shaft 53 supported by the bearings 52 and 55 secured to the top plate 90 (Fig. 7). The shafts 60 and 53 are connected by a chain 49 operably connected to the gears 56 and 51 on the outer end of their respective shafts 60 and 53. The gears 57 and 50 on their respective shafts 60 and 53 are operably connected up by suitable mechanism to the saw-tooth gear 190.

As shown in Fig. 10, the shaft 60 operates the slice roll 59, being supported by the bearings 58 and 61 secured to the top plate 90, and the slice roll 54 is operated by the shaft 53 supported by the bearings 52 and 55, and the slice roll 62 is operated by the shaft 77 supported by the bearings 63 and 78. These shafts are operably connected up by suitable mechanism.

In Fig. 7, is shown a wall 64 which forms the ends of the hoppers containing the slices in piles. In Fig. 10, this wall is shown as walls 64 and 76. The wall 64, as shown in Fig. 7, is secured to the top plate 90 by angle irons in such manner that the bottom of the wall 64 will be slightly raised above the top plate 90 to permit the bottom slices of the piles in the hoppers to advance under it to the slice rolls 59 and 62. In Fig. 10, the wall 64 is secured to the top plate 90 in a similar manner to permit the bottom slice of the pile in the hopper formed by the posts 65, the slide 66 and the wall 64, to advance under it to the slice roll 59. Also in Fig. 10, the wall 76 is secured to the top plate 90 in a similar manner to permit the bottom slice of the pile in the hopper formed by the posts 67, the slide 68 and the wall 76, to advance under it to the slice roll 62.

In case the slices are a little long they are trimmed off by means of the slice-trimmer knives (Fig. 11). The slice-trimmer knives 79 are secured to the top plate 90 by bolts 80 (Figs. 10 and 11). A mold-block 88 is secured to the top plate 90 by bolts 84. The jaws 83 are located in a recess in the top plate 90, having slots for the reception of the bolts 84 and of sufficient size to permit a forward and backward action of the jaws 83. The jaws 83 are furnished with springs 82, one end of which is secured to an upward projection in the recess of the top plate 90. The protectors 81 are hinged in a recess in the outward sides of the jaws 83 so that they will rest against the outside of the upward projection in the recess of the top plate 90. To give the cutting action to the slice-trimmer knives 79, the jaws 83 are spread apart the required distance by means of the plunger 85 secured to butt 86 secured to the end of the rod 87 which is operably connected up.

Figures 13, 14, 15, 16, 17:
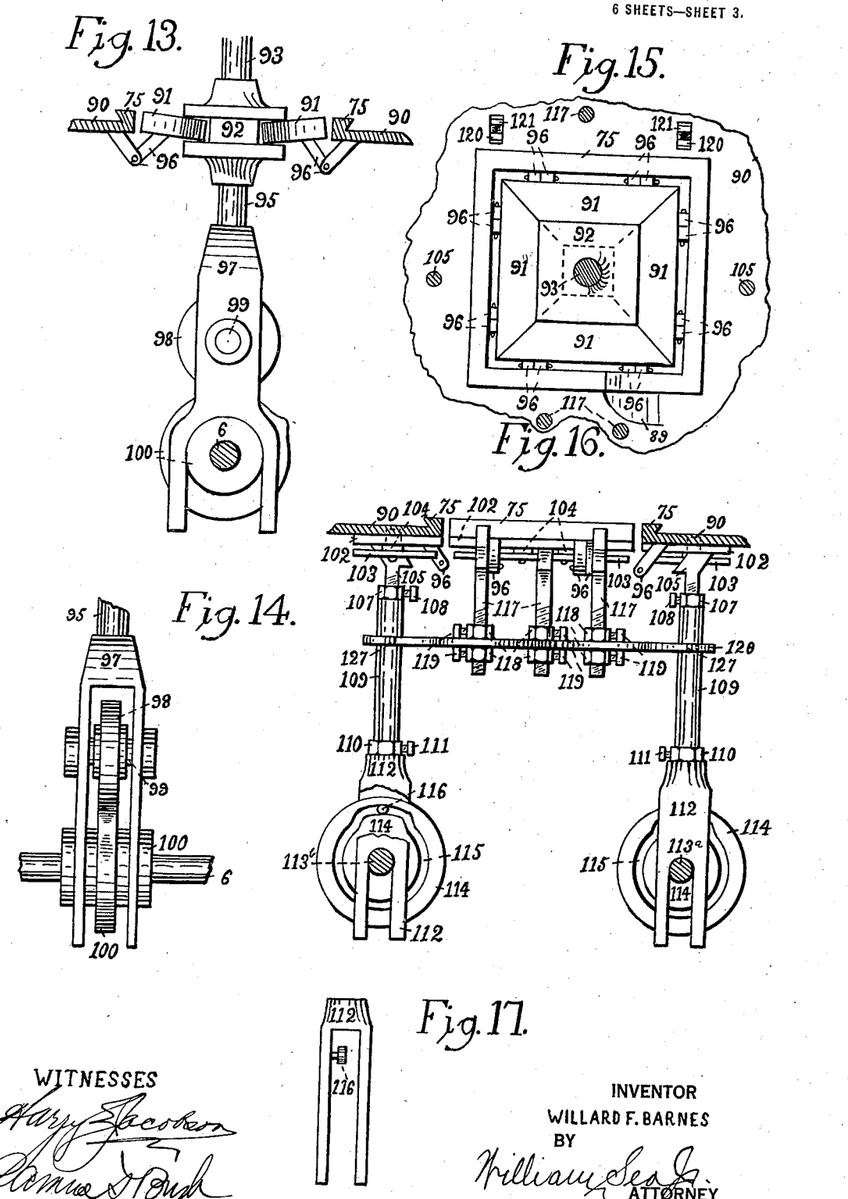
Fig. 13 is a detailed side elevation of squeezer-jaws with mechanism for operating same.
Fig. 14 is a detailed end elevation of mechanism for operating the squeezer-jaws.
Fig. 15 is a plan view of a section around the squeezer-jaws.
Fig. 16 is a detailed side elevation of the mechanism for opening and closing the bottom of the channel in which the binding strips are clamped on to the slices.
Fig. 17 is an end elevation of the fork showing wheel which rotates in the channel of the cam inserted in the fork.

After the binding-strip has been bent around the mold-block 94 and dropped into its channel, it is prevented from dropping too far by means of the slides 103 operably connected through pins 104 to the plates 102 secured to the underside of the top plate 90. The slides 103 are given a backward and forward movement by means of rods 105 and 117, the top end of which is shaped as shown in Fig. 16. As shown in Figs. 15 and 16, the front and rear rods 117 are supported by the plate 128. The top end of these rods are shaped the same as the top ends of the rods 105. The lower end of the rods 117 is threaded for the reception of the nuts 118, one above and one below the plate 128. These nuts 118 are retained after adjustment by the set-screws 130

119. The lower end of the rods 105 is threaded for the reception of the nut 107 and for threading into rod 109. The nut 107 is retained after adjustment by the set-screw 108. The plate 128 is secured to the rods 109 by means of set-screws 127. The rods 109 are threaded into forks 112, above which are located the nuts 110 which are retained after adjustment by set-screws 111. The fork 112 is provided with a wheel 116 operably connected to the inner side of one of the prongs of the fork 112. The foregoing mechanism secures its action through the working of the wheels 116 (Fig. 17) in a channel 115 (Fig. 16) of the cams 114 secured to the shafts 113$^a$ and 113$^b$.

The clamping of the binding-strip on to the edges of the slices is secured through the action of the squeezer-jaws 91 operably connected to the under side of the top plate 90 by hinges 96. The squeezer-jaws 91 rest in the plunger 92 (Fig. 13) adapted to the required action of the squeezer-jaws 91. A rod 93 for supporting the mold-block 94 is threaded into the top of the plunger 92. A rod 95 is threaded at each end for the reception of the plunger 92 and the fork 97. As shown in Figs. 13 and 14, the fork 97 is furnished with a wheel 98 on pin 99. The squeezer-jaws 91 receive their action of opening and closing by means of the lowering and raising of the fork 97 resting upon side extensions of a cam 100 secured to the main shaft 6. The cam 100 operates against the wheel 98, thus lowering and raising the fork 97 the required distance.

As shown in Fig. 24, the rods 134 and 135 are held in position by the supports 136.

As shown in Figs. 1, 7, 10, 25 and 26, the mold-block 94 is furnished with slots for the reception of the points or teeth of the spools 141.

In unbending, the binding-strip bending frame comes into a straight line against a strip 152 (Fig. 26) secured to the top plate 90.

In case the slices do not feed into the channel around the mold-block 94 or the binding-strip does not properly enter the bending links, the wire 156 (Fig. 27) located through the center of the middle bending link 144 (Figs. 26 and 27) comes into contact with the electrode 153 located in a recess in the mold-block 94. The wire 156 is cushioned by spring 157. In case the binding-strip 154 has properly entered the bending links as shown in Fig. 27, the wire 156 is prevented from coming into contact with the binding strip by means of the hinged insulation 159. An electrical contact established will signal an alarm by any suitable mechanism.

The rod 126 is given a forward and backward movement through a crank 171, crank-arm 172 operably connected to lever-arm 168 secured to lever 166 working on shaft 113$^b$. The closing of the kinking-dies is effected, through the foregoing mechanism, by a pin 164 secured to the gear 163 (Fig. 29) forcing the lever 166 upward, in rotating with the gear 163. The opening of the kinking-dies is effected by a pin 165 secured to the inside of the gear 163 forcing the rod 173, operably connected to the frame at one end and at the other operably connected to an extension of the lever-arm 172, upward, in rotating with the gear 163. Wherever the word "basket" is used in the specification, it is intended also to refer to any receptacle that may be made or manufactured by this machine.

The shape of the mold-block, formers, mold-block in connection with the squeezer-jaws, and the plungers can be changed so as to make or manufacture a basket of any number of sides or of any shape desired. Where this is done, the mechanism hereinbefore described can be so altered and added to so as to meet the different sided and shaped baskets, as for illustration the number of the bending links can be increased from five to whatever number of bending links is necessary to make the required sided basket.

In order to prevent the bending links from rebounding any slight distance after bending around the mold-block 94, the rods 105 and 117 are furnished with upper extensions which extend through the top plate 90 the required distance (Figs. 7 and 10), thus holding the bending links stationary for the required length of time.

As a basket is completed it is ejected from its former on to the slide 186 (Fig. 30). After fifty baskets have thus been ejected, the slide 186 is advanced by means of the rack 185 through the mechanism hereinbefore described so that a stack of fifty baskets may be easily removed.

Having thus described my invention what I claim and desire to secure by Letters Patent is:—

1. In a basket-making machine of the character described, a stationary mold-block, a cross-arm carrier carrying formers of such shape as to make the desired form of basket or other receptacle on each arm, mechanism by which said cross-arm is raised and lowered, and also given a revolving movement so that the reciprocating formers will co-act with the mold-block.

2. In a basket-making machine of the character described, a mold-block, means for folding slices into basket shape, said means consisting of formers, means for advancing the slices to position to be folded transversely in the formers, said means consisting of slides operated by dogs so that the ends of the slices will be caught by the slice rolls and thereby advanced to said position, means for retaining the slices in position in the formers during the subsequent operations, said means consisting of spools operably connected to the sides of the formers and furnished with pins or teeth.

3. In a basket-making machine of the character described, a mold-block, formers, means for forcing the slices into the formers, said means consisting of plungers, means for raising and lowering the plungers, said means consisting of sliding sleeves, means for permitting the sleeves to slide up and down, said means consisting of rods adapted to the sleeves, means to give the sleeves the sliding movement, said means consisting of butts on the ends of the sleeves, co-acting with bars functioning through pins supported by uprights.

4. In a basket-making machine of the character described, a mold-block, formers, plungers, means for advancing slices to position over the plungers, means for adjusting the slices in position thereon, said means consisting of slice-adjusters, sliding sleeves, means for operating the slice-adjusters, said means consisting of collars secured to the sliding sleeves, means for holding the slice-adjusters in position, said means consisting of supports secured to the bottom plate.

5. In a basket-making machine as described, a mold-block, formers co-acting therewith, means for raising and lowering the formers, said means consisting of an arbor-rod and a revolving sleeve adapted thereto and located on the upper part of the arbor-rod, and also a sliding sleeve adapted thereto and located below the revolving sleeve, means for raising and lowering the sliding sleeve, said means consisting of a cam operably connected to a gear, said arbor-rod and sliding sleeve being furnished with companion slots, one above the other, through which slots pass rods, the upper one being furnished with a wheel rotating in a channel of the cam, and the lower one being a reduced extension of the main shaft, on which is secured the cam.

6. In a basket-making machine of the character described, a mold-block, formers, means for rotating the formers, said means consisting of a revolving sleeve, an arbor-rod, means for rotating the revolving sleeve, said means consisting of a four-point spider, means for securing said spider, said means consisting of a collar on said revolving sleeve.

7. In a basket-making machine as described, a mold-block, formers co-acting with the mold-block, means for rotating the formers, said means consisting of a revolving sleeve, means for rotating the revolving sleeve, said means consisting of a four-point spider, means for checking the spider, said means consisting of a spider check.

8. In a basket-making machine as described, a mold-block, formers, means for rotating the formers, a revolving sleeve, means for rotating the revolving sleeve, means for stopping the revolving sleeve when it has rotated the required distance, said means consisting of a clutch secured to the top of the top plate and having a pin adapted to a slot in the revolving sleeve, and a four-point spider secured to the lower end of the revolving sleeve, and a spider check co-acting with the spider.

9. In a basket-making machine as described, a mold-block, formers, plungers, means for advancing slices over the plungers, means for forcing the slices into the formers, means for trimming off the edges of the slices, said means consisting of a mold-block over which the formers place the slices for the operation of trimming off the edges, slice-trimmer knives, jaws co-acting with the knives, and cushioned by a spring, means for spreading the jaws, said means consisting of a plunger operably connected up.

10. In a basket-making machine as described, a mold-block, formers, means for rotating the formers, means for advancing slices, means for forcing the slices into the formers, means for bending binding-strips around the mold-block, said means including a binding-strip bending frame of five bending links, each link being furnished with a slide operably connected up, push-rods, toggle-links operably connected with the push-rods through pins in the push-rods and working in slots in the toggle-links, the middle bending link having a forward and backward movement through two slots, means for giving the push-rods a reciprocating backward and forward movement, said means including a fork furnished with a rod with a wheel on the lower end thereof, a cam on the main shaft fashioned to operably co-act with the wheel, a raiser, means for joining the ends of the binding-strips, said means including mechanism by which one of the outer bending links, while being folded around the mold-block, slides up on the raiser so that the end of the binding-strip that it is bending around will clear the other end of said binding-strip being bent around the mold-block from the opposite direction, and when the latter end is in place, the former end will snap into place in the latter and thereby make a connection varying in length according to the length of the binding-strip.

11. In a basket-making machine of the character described, a mold-block, formers, means for advancing slices, means for forcing slices into the formers, means for bending binding-strips around the mold-block, means for clamping the binding-strip on to the edges of the slices to form the finished basket, said means including squeezer-jaws operably hinged to the under side of the top plate and resting in a plunger adapted to the required action of the squeezer-jaws, the upper end of the plunger being connected with the mold-block by a rod, and the lower end being connected by a rod to a fork, means for closing and opening the squeezer-jaws, said means including a wheel operably inserted in the fork, co-acting with a cam on the main shaft.

12. In a basket-making machine of the character described, a mold-block, means for preventing the binding-strips from falling through the channel around the mold-block, said means consisting of slides, means for operating said slides back and forth, said means including a plate furnished with rods operably connected therewith and with the slides, means for operating the plate, said means including forks operably connected to the bottom extension of two of the rods, each fork being furnished with a wheel co-acting with a cam secured to the main shaft.

13. In a basket-making machine of the character described, a mold-block, formers, means for bending binding-strips around the mold-block, means substantially as described for kinking or indenting the strips at points where they are to be bent, said means including kinking-dies operably connected with their respective supports by means of pin-bolts, means by which the kinking-dies are operated, said means including a bar with pins operably working in the kinking-dies, means for operating the bar, said means including a crank-arm operably connected to a lever-arm, a lever operably connected to a shaft, which lever in closing the kinking-dies is given an upward movement by a pin located on the outside of its gear, and in opening the kinking-dies a rod connected operably to an extention of the lever-arm and to the frame is forced up by means of a pin on the inside of said gear.

14. In a basket-making machine as described, a mold-block, formers, means for bending binding-strips around the mold-block, means for advancing slices, means for forcing the slices into the formers, means for signaling the fact that either the binding-strip has not fed into the means for bending it or the slices have not properly fed into the channel around the mold-block, said means including electrode, wire cushioned by a spring, insulation to prevent electrofication of the machine, substantially as described.

In testimony whereof, I have hereunto set my hand in the presence of two subscribing witnesses this 14th day of May, 1920.

WILLARD F. BARNES.

Witnesses:
MARK LANE,
HARRY E. JACOBSON.